(12) United States Patent
Freking et al.

(10) Patent No.: US 8,793,539 B2
(45) Date of Patent: Jul. 29, 2014

(54) EXTERNAL SETTINGS THAT RECONFIGURE THE ERROR HANDLING BEHAVIOR OF A DISTRIBUTED PCIE SWITCH

(75) Inventors: Ronald E. Freking, Rochester, MN (US); Elizabeth A. McGlone, Rochester, MN (US); Nicholas V. Tram, Rochester, MN (US); Curtis C. Wollbrink, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 13/495,357

(22) Filed: Jun. 13, 2012

(65) Prior Publication Data

US 2013/0339826 A1    Dec. 19, 2013

(51) Int. Cl.
 *G06F 11/00* (2006.01)
 *H03M 13/00* (2006.01)
 *G06F 11/07* (2006.01)

(52) U.S. Cl.
 CPC ........ *G06F 11/0793* (2013.01); *G06F 11/0703* (2013.01); *G06F 11/0781* (2013.01)
 USPC .............................. 714/48; 714/776; 714/811

(58) Field of Classification Search
 None
 See application file for complete search history.

(56) References Cited

U.S. PATENT DOCUMENTS

| | | | |
|---|---|---|---|
| 7,085,968 B2 | 8/2006 | Smith | |
| 7,412,626 B2 | 8/2008 | Wood et al. | |
| 7,533,300 B2 | 5/2009 | Marisetty et al. | |
| 7,889,667 B2 | 2/2011 | Boyd et al. | |
| 7,907,604 B2 * | 3/2011 | Boyd et al. | 370/359 |
| 8,416,803 B1 * | 4/2013 | Basson et al. | 370/465 |
| 8,503,468 B2 * | 8/2013 | Akyol et al. | 370/419 |
| 2010/0115174 A1 * | 5/2010 | Akyol et al. | 710/316 |
| 2010/0306442 A1 * | 12/2010 | Gregg | 710/313 |
| 2011/0154165 A1 * | 6/2011 | Primadani et al. | 714/799 |
| 2011/0258352 A1 * | 10/2011 | Williams et al. | 710/107 |
| 2011/0320671 A1 * | 12/2011 | Armstrong et al. | 710/306 |
| 2011/0320861 A1 * | 12/2011 | Bayer et al. | 714/5.11 |

* cited by examiner

*Primary Examiner* — Daniel McMahon
(74) *Attorney, Agent, or Firm* — Patterson & Sheridan LLP

(57) ABSTRACT

Method, computer program product, and system for performing an operation to maintain data integrity in a parallel computing system, the operation comprising providing a lookup table specifying a plurality of predefined destinations for data packets, receiving a first data packet comprising a destination address specifying a first destination, wherein the first data packet has an error of a first type, identifying, from the lookup table, an entry specifying a second destination for data packets having errors of the first type, and sending the first data packet to the second destination.

16 Claims, 4 Drawing Sheets

EXTERNAL SETTINGS THAT RECONFIGURE THE ERROR HANDLING BEHAVIOR OF A DISTRIBUTED PCIE SWITCH

BACKGROUND

Embodiments disclosed herein relate to routing in a distributed PCIe switch. More specifically, embodiments disclosed herein relate to external settings that reconfigure the error handling behavior of a distributed PCIe switch.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or PCIe slots, as well as permit communication between servers in the same or different chassis.

A PCI Express bus is an implementation of the Peripheral Components Interconnect ('PCI') computer bus according to the set of PCI Express specifications promulgated by the PCI Special Interest Group ('PCI SIG'). A PCI Express bus uses existing PCI programming and software concepts, but is based on a different and much faster serial physical-layer communications protocol. The physical-layer consists not of a bus, but of a network of serial interconnections extending to each device from a switch. The switch provides point-to-point communications between devices connected to the switch. Devices and switches operating according to the PCI Express specifications are generally referred to as 'PCI Express devices' and 'PCI Express switches' respectively.

A connection between any two PCI Express devices is referred to as a 'link.' A link consists of a collection of one or more lanes used for data communications between devices. Each lane is a set of two unidirectional low voltage differential signaling pairs of transmission pathways such as, for example, traces along a motherboard. Because transmitting data and receiving data are implemented using separate differential pairs, each lane allows for full-duplex serial data communication of up to eight gigabits of data per second.

SUMMARY

Embodiments disclosed herein provide a method and computer program product for performing an operation to maintain data integrity in a parallel computing system, the operation comprising providing a lookup table specifying a plurality of predefined destinations for data packets, receiving a first data packet comprising a destination address specifying a first destination, wherein the first data packet has an error of a first type, identifying, from the lookup table, an entry specifying a second destination for data packets having errors of the first type, and sending the first data packet to the second destination to avoid corrupting the first destination.

Another embodiment disclosed herein provides a system comprising a lookup table specifying a plurality of predefined destinations for data packets, and a PCIe switch configured to receive a first data packet comprising a destination address corresponding to a first destination, wherein the first data packet has an error of a first type, wherein the PCIe switch is configured to identify, based on the first error type, an entry in the lookup table specifying a different, second destination for data packets having errors of the first type, and wherein the PCIe switch is further configured send the first data packet to the second destination to avoid corrupting the first destination.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
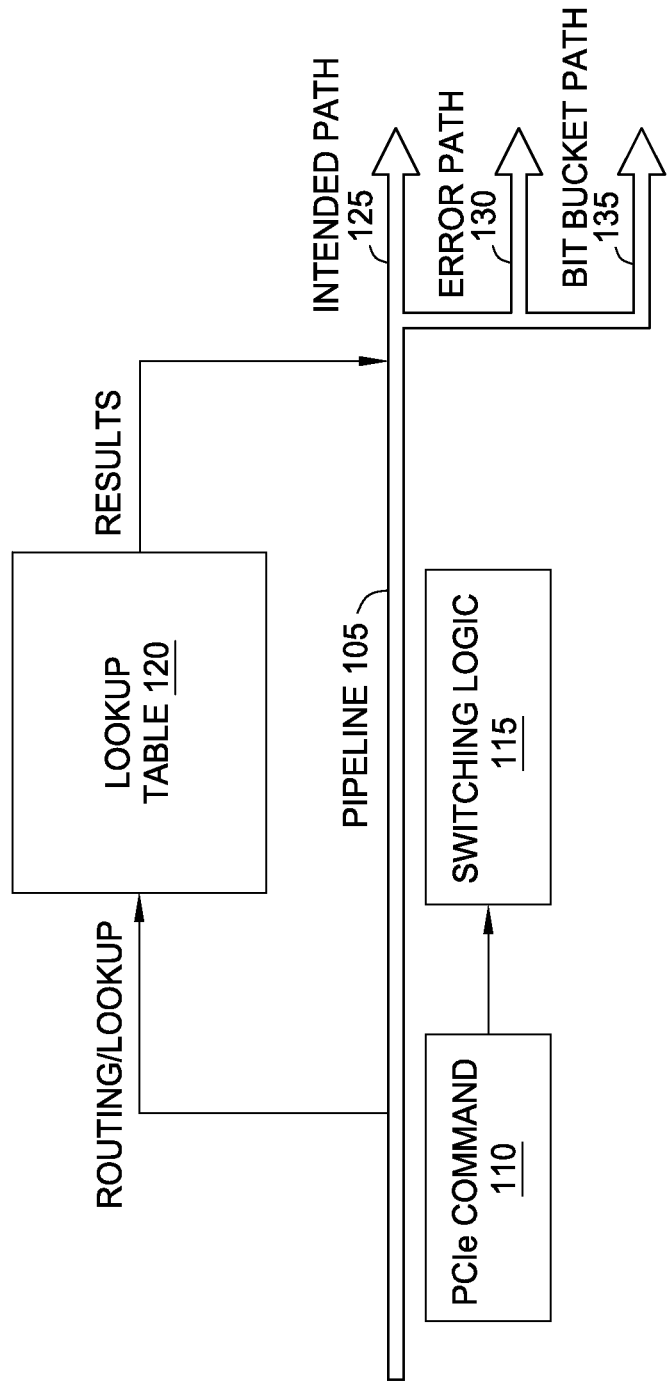
FIG. 1 is a schematic illustrating techniques for external settings that reconfigure the error handling behavior of a distributed PCIe switch, according to one embodiment disclosed herein.

Embodiments disclosed herein provide a method and computer program product for performing an operation to maintain data integrity in a parallel computing system, the operation comprising providing a lookup table specifying a plurality of predefined destinations for data packets, receiving a first data packet comprising a destination address specifying a first destination, wherein the first data packet has an error of a first type, identifying, from the lookup table, an entry specifying a second destination for data packets having errors of the first type, and sending the first data packet to the second destination to avoid corrupting the first destination.

Another embodiment disclosed herein provides a system comprising a lookup table specifying a plurality of predefined destinations for data packets, and a PCIe switch configured to receive a first data packet comprising a destination address corresponding to a first destination, wherein the first data packet has an error of a first type, wherein the PCIe switch is configured to identify, based on the first error type, an entry in the lookup table specifying a different, second destination for data packets having errors of the first type, and wherein the PCIe switch is further configured send the first data packet to the second destination to avoid corrupting the first destination.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the application to configure PCIe routing tables could execute on a computing system in the cloud and define routing information for packets containing errors. In such a case, the application could define the routing information and store the values into a routing table at a storage location in the cloud. Doing so allows a user to access this information from any computing system attached to a network connected to the cloud (e.g., the Internet).

FIG. 1 is a schematic 100 illustrating techniques for external settings that reconfigure the error handling behavior of a distributed Peripheral Component Interconnect Express (PCIe) switch, according to one embodiment disclosed herein. Generally, the schematic 100 shows a pipeline 105 which may be part of a distributed switch that routes and transmits PCIe data packets (also referred to as PCIe commands) 110. A pipeline may generally be defined as a flow of all data packets within a given hierarchy. The pipeline 105 may use a lookup table for the routing of data packets. The distributed switch may be comprised of a plurality of sub-switches connected by a network fiber. In some embodiments, the flow of data may be from a root complex (or a host) to an endpoint (such as PCIe graphics card). In other embodiments, the data flow may be from an endpoint to a root complex. In either embodiment, the data may flow through at least one sub-switch in the distributed switch over a pipeline such as pipeline 105. As shown, a PCIe command 110 is transmitted via the pipeline 105. The PCIe command 110 may have an intended destination which may be part of a destination address header field in the PCIe command 110. Routing information may facilitate the flow of traffic between the sub-switches in the distributed switch. The routing information may define a path from one sub-switch to another sub-switch by specifying which port traffic must be sent through to reach the intended destination, or it may define a simple identification of said destination used in later fabric routing. A lookup table (also referred to as a routing table) 120 may be implemented in each sub-switch to provide routing information to assist the flow of traffic from one sub-switch to another, and ultimately to the final destination. In some embodiments, the lookup table 120 may be an indirect lookup table, such that an address conversion may be completed to determine the correct address for the sub-switch, host, or endpoint. The switching logic 115 may generally be configured to retrieve routing information from the lookup table 120. Therefore, when the PCIe command 110 is on the pipeline, the switching logic 115 may reference the lookup table 120 to determine on which path the PCIe command 110 should be sent, for example, the intended path 125, to reach its intended destination.

However, an error in the PCIe command 110 may be detected. If an error is detected in the PCIe command 110, it may be advantageous to reroute the command 110 so it does not reach the destination found in the command's header field. Rerouting the command may, for example, prevent data corruption or device corruption at the destination specified in the header field. Using the lookup table 120, the switching logic 115 may change the destination to a debugging location or a logging array (also referred to as a bit bucket) specified in additional fields in the entries of the lookup table 120. Therefore, the PCIe command 110 containing an error may be re-routed by the switching logic 115 to a debugging destination via error path 130, or to a logging array via bit bucket path 135. The lookup table 120 may contain entries specific to a plurality of different errors, including, but not limited to (i) an error correction code (ECC) error, (ii) an end-to-end cyclic redundancy code (CRC) error, (iii) a parity error, and (iv) a protocol error. Once at the debugging destination, debugging techniques may be performed to address the error. If transmitted to the logging array, each error may be stored for further review by a system administrator.

The lookup table 120 may contain globally defined error destinations, or error destinations specific to one or more destinations. Furthermore, respective error destinations may be specified for each of the plurality of different error types. The lookup table 120 may contain predefined error entries, or the table may be modified by the switching logic 115 in order to reflect new or changed entries. For example, if a new error type is detected, the switching logic 115 may select a predefined catchall destination, or the switching logic 115 may create a new entry in the lookup table 115 to accommodate the new error. By defining a destination for a new error type, the switching logic 115 may again reference the lookup table 120 to route subsequent packets containing the new error to the proper error destination.

Figure 2:
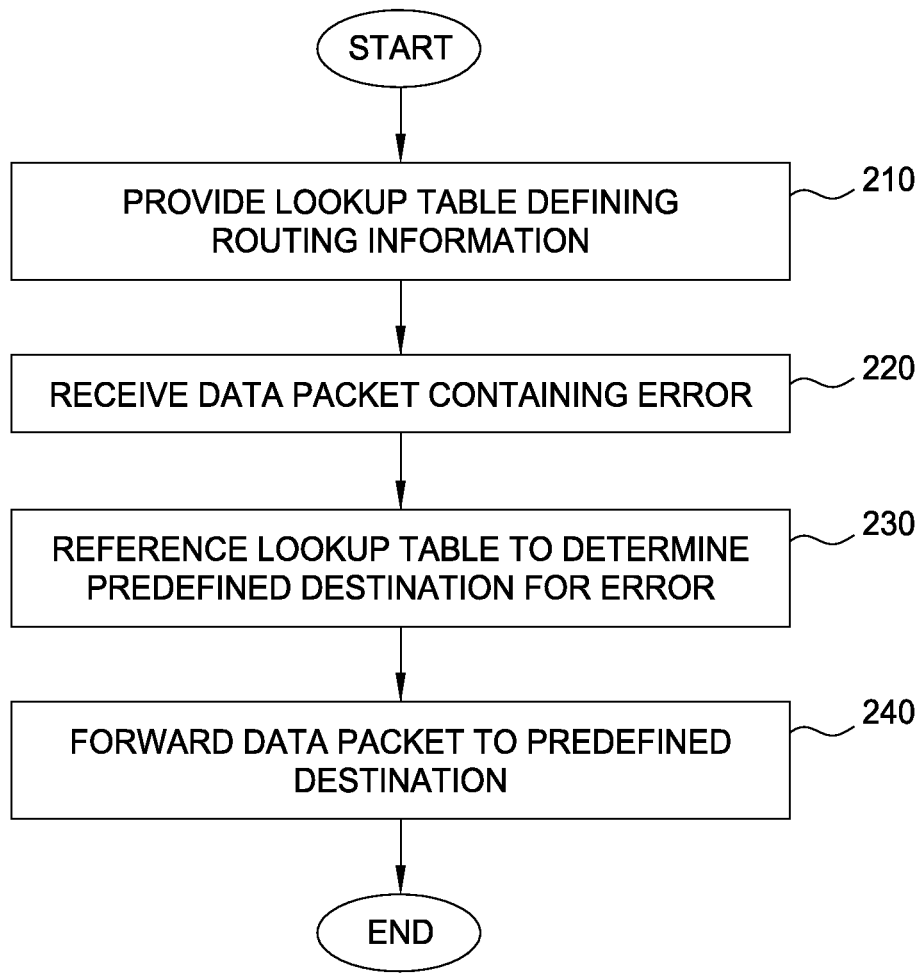
FIG. 2 is a flow chart illustrating a method for reconfiguring the error handling behavior of a distributed PCIe switch, according to one embodiment disclosed herein.

FIG. 2 is a flow chart illustrating a method 200 for reconfiguring the error handling behavior of a distributed PCIe switch, according to one embodiment disclosed herein. Generally, the method 200 provides a lookup table which may contain a plurality of entries containing routing information allowing distributed PCIe switches to forward PCIe traffic to the correct destination. A switch may be a method of expanding a hierarchy. In point-to-point hierarchies, there may be no way to get a single source to reach multiple destinations unless a switch is used. A switch may expand the range of destinations for a given source. Any method can be used to detect an error in the PCIe packets. If the PCIe traffic contains an error, the traffic is forwarded to an error destination to prevent corrupting the intended destination with corrupted data. At step 210, a lookup table is provided to define routing information. A PCIe switch may handle bidirectional traffic, in that the traffic may flow in two directions. In one direction, the traffic may flow from a host/root complex to a PCIe endpoint (peripheral), such as a graphics adapter, network card, and the like. Alternatively, the traffic may flow from the PCIe endpoint to the host/root complex. A PCIe endpoint may be represented in the lookup table by data taking any number of formats, including, but not limited to a unique: (i) device number, (ii) bus number, (iii) prefetchable address range, and (iv) nonprefetchable address range. In a distributed system containing a plurality of hosts/root complexes, a virtual hierarchy may be implemented to uniquely identify each unique host/root complex. Therefore, a virtual host identification number may be used to represent a unique host/root complex in the lookup table to facilitate the flow of traffic from an endpoint to a host/root complex. The lookup table, in some embodiments, may be an indirect lookup table, as the entries in the lookup table may not be in the same format as the address headers in the PCIe data packets. Therefore, a translation of information in the packet may be performed in order to convert one format to another to provide a destination. Any suitable method for translation may be implemented.

At step 220, a data packet containing an error is received in a PCIe switch. The presence of the error may be detected at the PCIe switch, or the error may be detected at another switch which indicated the presence of the error in a field of the data packet. Any number of algorithms may be used to detect the presence of an error in the switch. For example, the PCIe switch may ensure that the error-detecting codes (e.g., ECC or CRC) attached to the received packets still match the calculated values. In some embodiments, the detection of an error may trigger the generation of an error code specific to the error type. At step 230, the PCIe switch references the lookup table to determine a predefined destination for the packet containing the error. In some embodiments, the predefined destination may be associated with an error code, and the predefined destination may be returned based on the error code. The lookup table may provide a global error destination for a particular error independent of an intended destination. The lookup table may also specify an error destination based on the type of error and the intended destination of the current packet. Therefore, the lookup table may provide entries for a type of error, or the error type may be associated with a destination, where each type of error may have multiple error destinations based on the intended destination. If an error destination is not specified, a default/global error destination may be selected, or the PCIe switch may contain logic which may define a new error destination. Alternatively, a system administrator may define an error destination. The error destination may further specify more than one destination which may be chosen as the error destination, one of which may be selected as the error destination. For example, a debug endpoint may be provided as the error destination where error analysis may be conducted on the data packet. Alternatively, a logging endpoint may be selected as the error destination, where all error data is received and stored for review. The error destination ultimately selected from the lookup table may then be used as a new destination for the packet.

At step 240, the PCIe switch may forward the data packet to the error destination provided by the lookup table at step 230. In some embodiments, the data packet may be dropped, and not sent to any destination. In some other embodiments, the data packet having the error may have its internal structure altered so that the corruption is detected at another switch for further processing since some errors cannot be detected until the end of the packet making it impossible to have the entire packet rerouted because the routing is at the front of the packet. In these embodiments, the data packet may be encapsulated in another packet containing the updated destination address information. By operating in such a manner, data packets containing errors (corrupted data) will not reach its originally intended destination, thereby preventing the corruption of the originally intended destination. Furthermore, by enabling the logging of each data packet containing an error, debugging will be facilitated by having a complete picture of all the errors occurring in the system.

An Example System

Figure 3:
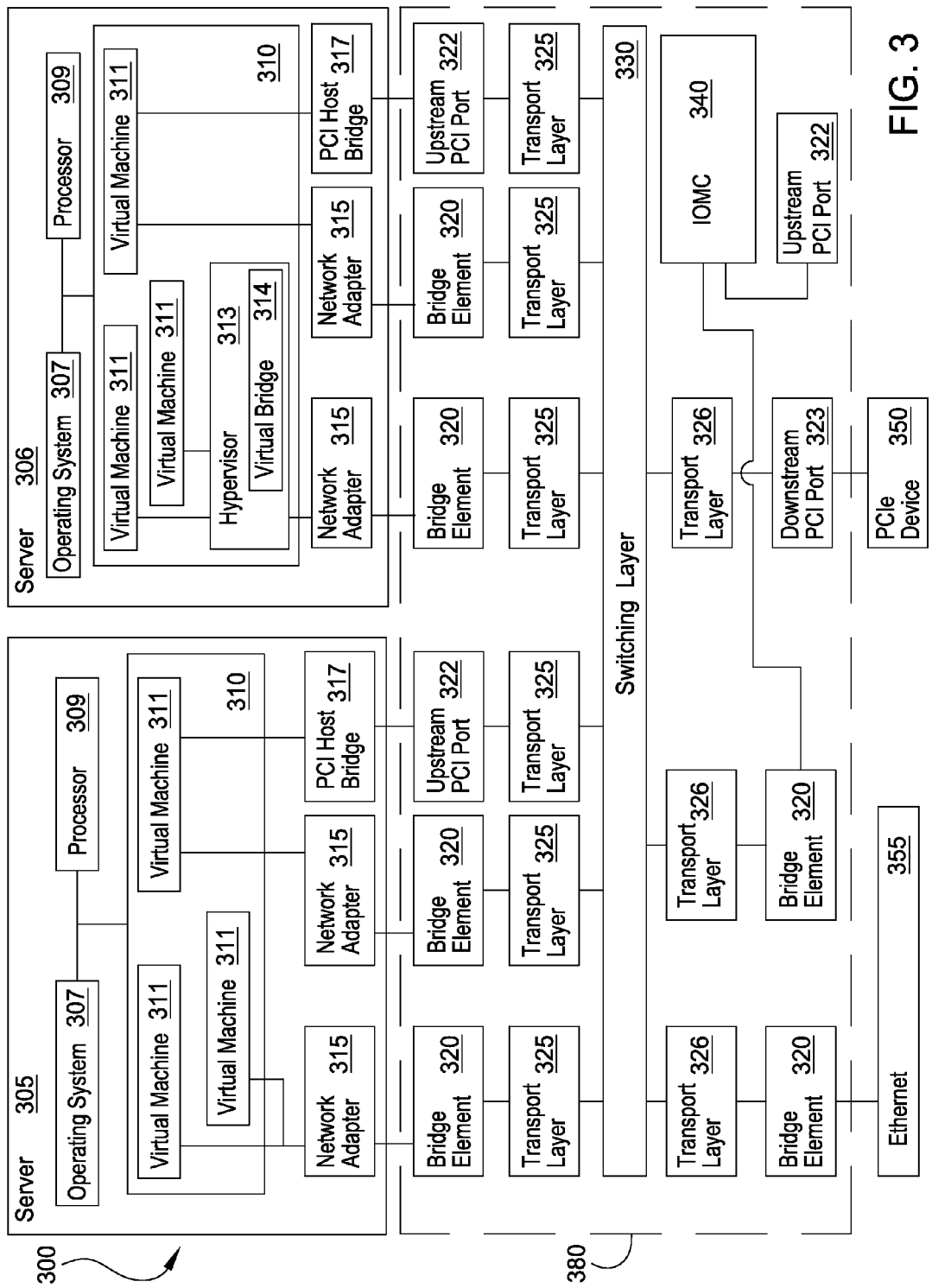
FIG. 3 illustrates a system architecture including external settings that reconfigure the error handling behavior of a distributed PCIe switch, according to one embodiment disclosed herein.

FIG. 3 illustrates a system architecture 300 that includes external settings that reconfigure the error handling behavior of a distributed PCIe switch, according to one embodiment disclosed herein. The first server 305 may include at least one processor 309 coupled to a memory 310. The processor 309 may represent one or more processors (e.g., microprocessors) or multi-core processors. The memory 310 may represent random access memory (RAM) devices comprising the main storage of the server 305, as well as supplemental levels of memory, e.g., cache memories, non-volatile or backup memories (e.g., programmable or flash memories), read-only memories, and the like. In addition, the memory 310 may be considered to include memory storage physically located in the server 305 or on another computing device coupled to the server 305.

The server 305 may operate under the control of an operating system 307 and may execute various computer software applications, components, programs, objects, modules, and data structures, such as virtual machines 311.

The server 305 may include network adapters 315 (e.g., converged network adapters). A converged network adapter may include single root I/O virtualization (SR-IOV) adapters such as a Peripheral Component Interconnect Express (PCIe) adapter that supports Converged Enhanced Ethernet (CEE). Another embodiment of the system 300 may include a multi-root I/O virtualization (MR-IOV) adapter. The network adapters 315 may further be used to implement of Fiber Channel over Ethernet (FCoE) protocol, RDMA over Ethernet, Internet small computer system interface (iSCSI), and the like. In general, a network adapter 315 transfers data using an Ethernet or PCI based communication method and may be coupled to one or more of the virtual machines 311. Additionally, the adapters may facilitate shared access between the virtual machines 311. While the adapters 315 are shown as being included within the server 305, in other embodiments, the adapters may be physically distinct devices that are separate from the server 305.

In one embodiment, each network adapter 315 may include a converged adapter virtual bridge (not shown) that facilitates data transfer between the adapters 315 by coordinating access to the virtual machines 311. Each converged adapter virtual bridge may recognize data flowing within its domain (i.e., addressable space). A recognized domain address may be routed directly without transmitting the data outside of the domain of the particular converged adapter virtual bridge.

Each network adapter 315 may include one or more Ethernet ports that couple to one of the bridge elements 320. Additionally, to facilitate PCIe communication, the server may have a PCI Host Bridge 317. The PCI Host Bridge 317 would then connect to an upstream PCI port 322 on a switch element in the distributed switch 380. The data is then routed via the switching layer 330 to the correct downstream PCI port 323 which may be located on the same or different switch module as the upstream PCI port 322. The data may then be forwarded to the PCI device 350.

The bridge elements 320 may be configured to forward data frames throughout the distributed virtual switch 380. For example, a network adapter 315 and bridge element 320 may be connected using two 30 Gbit Ethernet connections or one 300 Gbit Ethernet connection. The bridge elements 320 forward the data frames received by the network adapter 315 to the switching layer 330. The bridge elements 320 may include a lookup table that stores address data used to forward the received data frames. For example, the bridge elements 320 may compare address data associated with a received data frame to the address data stored within the lookup table. Thus, the network adapters 315 do not need to know the network topology of the distributed switch 380.

The distributed virtual switch 380, in general, includes a plurality of bridge elements 320 that may be located on a plurality of a separate, though interconnected, hardware components. To the perspective of the network adapters 315, the switch 380 acts like one single switch even though the switch 380 may be composed of multiple switches that are physically located on different components. Distributing the switch 380 provides redundancy in case of failure.

Each of the bridge elements 320 may be connected to one or more transport layer modules 325 that translate received data frames to the protocol used by the switching layer 330. For example, the transport layer modules 325 may translate data received using either an Ethernet or PCI communication method to a generic data type (i.e., a cell) that is transmitted via the switching layer 330 (i.e., a cell fabric). Thus, the switch modules comprising the switch 380 are compatible with at least two different communication protocols—e.g., the Ethernet and PCIe communication standards. That is, at least one switch module has the necessary logic to transfer different types of data on the same switching layer 330.

Figure 4:
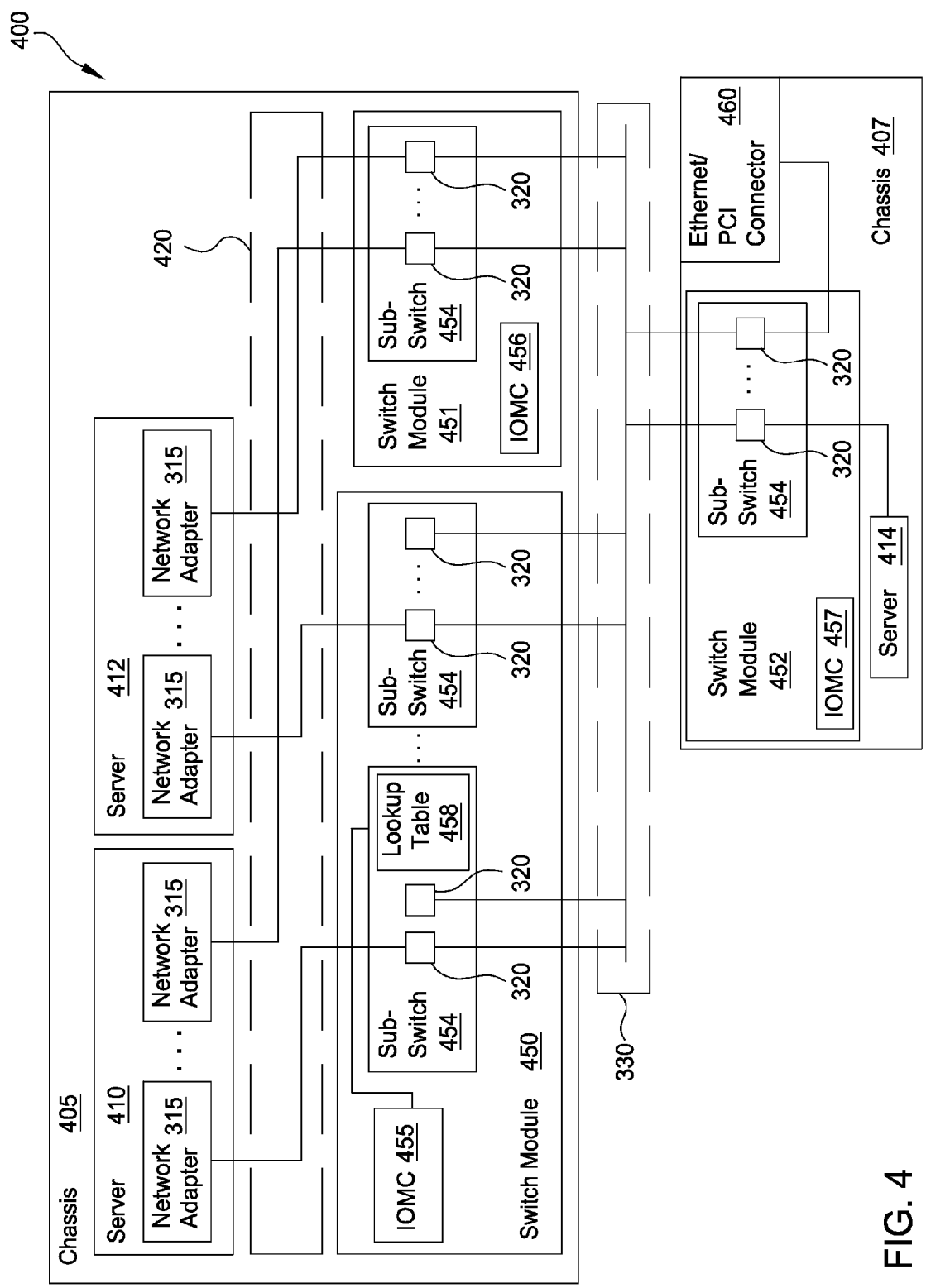
FIG. 4 illustrates the hardware representation of a system that implements external settings that reconfigure the error handling behavior of a distributed PCIe switch, according to one embodiment disclosed herein.

Although not shown in FIG. 4, in one embodiment, the switching layer 330 may comprise a local rack interconnect with dedicated connections which connect bridge elements 320 located within the same chassis and rack, as well as links for connecting to bridge elements 320 in other chassis and racks.

After routing the cells, the switching layer 330 may communicate with transport layer modules 326 that translate the cells back to data frames that correspond to their respective communication protocols. A portion of the bridge elements 320 may facilitate communication with an Ethernet network 355 which provides access to a LAN or WAN (e.g., the Internet). Moreover, PCI data may be routed to a downstream PCI port 323 that connects to a PCIe device 350. The PCIe device 350 may be a passive backplane interconnect, as an expansion card interface for add-in boards, or common storage that can be accessed by any of the servers connected to the switch 380.

Although "upstream" and "downstream" are used to describe the PCI ports, this is only used to illustrate one possible data flow. For example, the downstream PCI port 323 may in one embodiment transmit data from the connected to the PCIe device 350 to the upstream PCI port 322. Thus, the PCI ports 322, 323 may both transmit as well as receive data.

A second server 306 may include a processor 309 connected to an operating system 307 and memory 310 which includes one or more virtual machines 311 similar to those found in the first server 305. The memory 310 of server 306 also includes a hypervisor 313 with a virtual bridge 314. The hypervisor 313 manages data shared between different virtual machines 311. Specifically, the virtual bridge 314 allows direct communication between connected virtual machines 311 rather than requiring the virtual machines 311 to use the bridge elements 320 or switching layer 330 to transmit data to other virtual machines 311 communicatively coupled to the hypervisor 313.

An Input/Output Management Controller (IOMC) 340 (i.e., a special-purpose processor) is coupled to at least one bridge element 320 or upstream PCI port 322 which provides the IOMC 340 with access to the switching layer 330. One function of the IOMC 340 may be to receive commands from an administrator to configure the different hardware elements of the distributed virtual switch 380. In one embodiment, these commands may be received from a separate switching network from the switching layer 330.

Although one IOMC 340 is shown, the system 300 may include a plurality of IOMCs 340. In one embodiment, these IOMCs 340 may be arranged in a hierarchy such that one IOMC 340 is chosen as a master while the others are delegated as members (or slaves).

FIG. 4 illustrates the hardware representation of a system 300 that implements external settings that reconfigure the error handling behavior of a distributed PCIe switch, according to one embodiment disclosed herein. Server 410 and 412 may be physically located in the same chassis 405; however, the chassis 405 may include any number of servers. The chassis 405 also includes a plurality of switch modules 450, 451 that include one or more sub-switches 454 (i.e., a microchip). In one embodiment, the switch modules 450, 451, 452 are hardware components (e.g., PCB boards, FPGA boards, etc.) that provide physical support and connectivity between the network adapters 315, PCI Host Bridges 317, and the bridge elements 320. In general, the switch modules 450, 451, 452 include hardware that connects different chassis 405, 407 and servers 410, 412, 414 in the system 400 and may be a single, replaceable part in the computing system.

The switch modules 450, 451, 452 (e.g., a chassis interconnect element) include one or more sub-switches 454 and an IOMC 455, 456, 457. The sub-switches 454 may include a logical or physical grouping of bridge elements 320—e.g., each sub-switch 454 may have five bridge elements 320. Each bridge element 320 may be physically connected to the servers 410, 412. For example, a bridge element 320 may route data sent using either Ethernet or PCI communication protocols to other bridge elements 320 attached to the switching layer 330 using the routing layer. However, in one embodiment, the bridge element 320 may not be needed to provide connectivity from the network adapter 315 to the switching layer 330 for PCI or PCIe communications.

Each switch module 450, 451, 452 includes an IOMC 455, 456, 457 for managing and configuring the different hardware resources in the system 400. In one embodiment, the respective IOMC for each switch module 450, 451, 452 may be responsible for configuring the hardware resources on the particular switch module. However, because the switch modules are interconnected using the switching layer 330, an IOMC on one switch module may manage hardware resources on a different switch module. As discussed above, the IOMCs 455, 456, 457 are attached to at least one sub-switch 454 (or bridge element 320) in each switch module 450, 451, 452 which enables each IOMC to route commands on the switching layer 330. For clarity, these connections for IOMCs 456 and 457 have been omitted. Moreover, switch modules 451, 452 may include multiple sub-switches 454.

The dotted line in chassis 405 defines the midplane 420 between the servers 410, 412 and the switch modules 450, 451. That is, the midplane 420 includes the data paths (e.g., conductive wires or traces) that transmit data between the network adapters 315, PCI Host Bridges 317 and the sub-switches 454.

Each bridge element 320 connects to the switching layer 330 via the routing layer. In addition, a bridge element 320 may also connect to a network adapter 315 or an uplink. As used herein, an uplink port of a bridge element 320 provides a service that expands the connectivity or capabilities of the system 400. As shown in chassis 407, one bridge element 320 includes a connection to an Ethernet or PCI connector 460. For Ethernet communication, the connector 460 may provide the system 400 with access to a LAN or WAN (e.g., the Internet). Alternatively, the port connector 460 may connect the system to a PCIe expansion slot—e.g., PCIe device 350. The device 350 may be additional storage or memory which each server 410, 412, 414 may access via the switching layer 330. Advantageously, the system 400 provides access to a switching layer 330 that has network devices that are compatible with at least two different communication methods.

As shown, a server 410, 412, 414 may have a plurality of network adapters 315. This provides redundancy if one of these adapters 315 fails. Additionally, each adapter 315 may be attached via the midplane 420 to a different switch module 450, 451, 452. As illustrated, one adapter of server 410 is communicatively coupled to a bridge element 320 located in switch module 450 while the other adapter is connected to a bridge element 320 in switch module 451. If one of the switch modules 450, 451 fails, the server 410 is still able to access the switching layer 330 via the other switching module. The failed switch module may then be replaced (e.g., hot-swapped) which causes the IOMCs 455, 456, 457 and bridge elements 320 to update the routing tables and lookup tables to include the hardware elements on the new switching module.

As shown, a lookup table 458 may reside in the memory of the sub-switch 454. In other embodiments, the lookup table 458 may reside in memory at any location in the switch module 450, for example in the IOMC 455. A corresponding lookup table is omitted from the additional sub-switches 454 for the sake of clarity. The lookup table 458 may contain routing information to facilitate transfer of data packets among the plurality of switch modules 250, 251, and 254, the PCI Host Bridges 117, and the PCIe devices 350. When a PCIe data packet is received at a sub-switch 254, the destination address in the PCIe address header is read to determine a destination. Based on the destination address, the lookup table 458 may be referenced to resolve a path by which the destination may be reached. The PCIe data packet may then be encapsulated in another data packet (i.e., a cell) containing the retrieved destination information from the lookup table 458. If the data packet has an error, an error destination may be determined from the lookup table 458. Once this error routing information is retrieved, PCIe data packet may be encapsulated in a packet containing the error routing information. Once the encapsulated PCIe packet reaches its error destination, the PCIe data may be extracted for further processing. By routing PCIe data packets containing errors in such a fashion, the encapsulated PCIe data packet may not reach its intended destination, which may not be corrupted by erroneous data.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer program product for maintaining data integrity in a parallel computing system, the computer program product comprising:
   a non-transitory computer-readable storage medium having computer-readable program code embodied therewith, the computer-readable program code comprising:
   computer-readable program code configured to provide a lookup table specifying a plurality of predefined destinations for data packets;
   computer-readable program code configured to receive a first data packet comprising a destination address corresponding to a first destination, wherein the first data packet has an error of a first type;
   computer-readable program code configured to identify, based on the error of the first type, an entry in the lookup table specifying a different, second destination for data packets having errors of the first type;
   upon determining that the second destination is not defined, defining the second destination for the error of the first type in the lookup table; and
   computer-readable program code configured to send the first data packet to the second destination.

2. The computer program product of claim 1, further comprising not sending the first data packet to the first destination, wherein indentifying the entry in the lookup table further comprises: generating a error code based on the error of the first type; and identifying the second destination based on the error code.

3. The computer program product of claim 2, further comprising:
   receiving a second data packet comprising a second destination address specifying a third destination, wherein the second data packet has an error of the first type; and
   sending the second data packet to the second destination.

4. The computer program product of claim 3, wherein the second destination is at least one of (i) a logging array and (ii) a debug bus.

5. The computer program product of claim 4, further comprising dropping the first data packet.

6. The computer program product of claim 5, wherein the error of the first type is selected from the group comprising: (i) an error correction code (ECC) error, (ii) an end-to-end cyclic redundancy code (CRC) error, (iii) a parity error, and (iv) a protocol error.

7. The computer program product of claim 6, wherein the first destination and the second destination specify an endpoint, wherein the first destination and the second destination are configurable to include: (i) a device number, (ii) a bus number, (iii) a prefetchable address range, and (iv) a nonprefetchable address range of a plurality of endpoints.

8. The computer program product of claim 6, wherein the first destination specifies a virtual host identification number identifying a host, wherein the second destination is configurable to include: (i) a device number, (ii) a bus number, (iii) a prefetchable address range, and (iv) a nonprefetchable address range of a plurality of endpoints.

9. A system, comprising:
   a lookup table specifying a plurality of predefined destinations for data packets; and
   a PCIe switch configured to receive a first data packet comprising a destination address corresponding to a first destination, wherein the first data packet has an error of a first type, wherein the PCIe switch is configured to identify, based on the error of the first type, an entry in the lookup table specifying a different, second destination for data packets having errors of the first type, wherein the PCIe switch is configured to, upon determining that the second destination is not defined, define the second destination for the error of the first type in the lookup table, and wherein the PCIe switch is further configured send the first data packet to the second destination to avoid corrupting the first destination.

10. The system of claim 9, wherein the PCIe switch is further configured to not send the first data packet to the first destination.

11. The system of claim 10, wherein the PCIe switch is further configured to:
    receive a second data packet comprising a second destination address specifying a third destination, wherein the second data packet has an error of the first type; and
    send the second data packet to the second destination.

12. The system of claim 11, wherein the second destination is at least one of (i) a logging array and (ii) a debug bus.

13. The system of claim 12, wherein the PCIe switch is configured to drop the first data packet.

14. The system of claim 13, wherein the error of the first type is selected from the group comprising: (i) an error correction code (ECC) error, (ii) an end-to-end cyclic redundancy code (CRC) error, (iii) a parity error, and (iv) a protocol error.

15. The system of claim 14, wherein the first destination and the second destination specify an endpoint, wherein the first destination and the second destination are configurable to include: (i) a device number, (ii) a bus number, (iii) a prefetchable address range, and (iv) a nonprefetchable address range of a plurality of endpoints.

16. The system of claim 14, wherein the first destination specifies a virtual host identification number identifying a host, wherein the second destination is configurable to include: (i) a device number, (ii) a bus number, (iii) a prefetchable address range, and (iv) a nonprefetchable address range of a plurality of endpoints.

\* \* \* \* \*